(12) United States Patent
Mastrogiacomo et al.

(10) Patent No.: US 11,783,971 B2
(45) Date of Patent: Oct. 10, 2023

(54) JOINT, ELECTRICAL FEEDTHROUGH, AND SENSOR

(71) Applicant: KISTLER HOLDING AG, Winterthur (CH)

(72) Inventors: Giovanni Mastrogiacomo, Zurich (CH); Hans Beat Maerki, Kollbrunn (CH); Thomas Cadonau, Kirchberg (CH)

(73) Assignee: KISTLER HOLDING AG, Winterthur (CH)

( * ) Notice: Subject to any disclaimer, the term of this patent is extended or adjusted under 35 U.S.C. 154(b) by 9 days.

(21) Appl. No.: 17/569,750

(22) Filed: Jan. 6, 2022

(65) Prior Publication Data

US 2022/0223323 A1 Jul. 14, 2022

(30) Foreign Application Priority Data

Jan. 8, 2021 (EP) .................................... 21150799

(51) Int. Cl.
*H01B 17/30* (2006.01)
*C03C 27/04* (2006.01)
*G01D 11/24* (2006.01)

(52) U.S. Cl.
CPC ......... *H01B 17/305* (2013.01); *C03C 27/042* (2013.01); *G01D 11/245* (2013.01)

(58) Field of Classification Search
CPC .................................................. H01B 17/305
USPC ....................................................... 174/650
See application file for complete search history.

(56) References Cited

U.S. PATENT DOCUMENTS

| 3,638,076 A | 1/1972 | Koons |
| 4,016,437 A | 4/1977 | Calderara et al. |
| 6,111,198 A * | 8/2000 | Tower ..................... H01L 23/10 |
| | | 174/50.56 |

(Continued)

FOREIGN PATENT DOCUMENTS

| CN | 105612019 A | 5/2016 |
| CN | 105 481 253 B | 1/2019 |

(Continued)

OTHER PUBLICATIONS

CN Search Repot for Cn application No. 202210015060.5.

(Continued)

*Primary Examiner* — Stanley Tso
(74) *Attorney, Agent, or Firm* — Dority & Manning, P.A.

(57) ABSTRACT

A joint joins an alloy member to a ceramic member via a glass joining agent, which is joined to the alloy member by a material bonded joint and to the ceramic member by a further material bonded joint. The glass joining agent is made of a glass having a melting point below 800° C.; a coefficient of thermal expansion of at least $9\cdot 10^{-6}$ $K^{-1}$ and a bismuth content of at least 10%. The alloy member has a coefficient of thermal expansion of at least $9\cdot 10^{-6}$ $K^{-1}$. The ceramic member has a maximum coefficient of thermal expansion of $8\cdot 10^{-6}$ $K^{-1}$. The material bonded joint defines a mixing region that is a partial region of the ceramic member, and the bismuth content in the mixing region is higher than that of the ceramic member outside the mixing region.

18 Claims, 12 Drawing Sheets

(56) References Cited

U.S. PATENT DOCUMENTS

Figure 1:
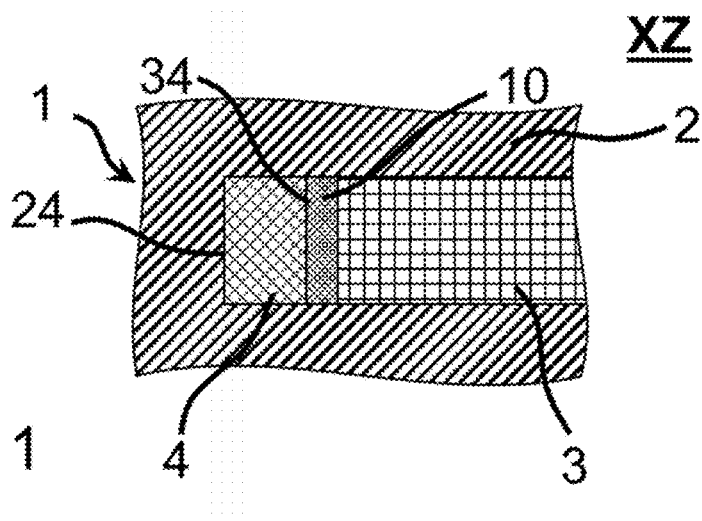

| | | | | |
|---|---|---|---|---|
| 2011/0000531 A1* | 1/2011 | Kwag | ............... | H01L 31/02168 |
| | | | | 257/E31.127 |
| 2016/0056570 A1* | 2/2016 | Yoshikawa | ............ | B23K 35/26 |
| | | | | 174/257 |
| 2016/0228966 A1 | 8/2016 | Mastrogiacomo et al. | | |
| 2016/0293301 A1* | 10/2016 | Choto | ................. | H01F 17/0013 |
| 2021/0280934 A1 | 9/2021 | Hartl | | |

FOREIGN PATENT DOCUMENTS

| | | |
|---|---|---|
| CN | 108 511 641 B | 11/2020 |
| DE | 10 2014 016600 A1 | 5/2016 |
| EP | 0 978 888 A1 | 2/2000 |
| EP | 1 688 160 A2 | 8/2006 |
| EP | 2388101 A1 | 11/2011 |
| JP | S5895673 A | 6/1983 |
| JP | H0891950 * | 4/1996 |
| JP | H0891950 A | 4/1996 |
| JP | 2007186395 A | 7/2007 |
| JP | 201505801 * | 11/2015 |
| JP | 2015205801 A | 11/2015 |
| JP | 2016 216300 A | 12/2016 |
| WO | WO2020/104571 A1 | 5/2020 |

OTHER PUBLICATIONS

CN Office Action with English translation for CN application No. 202210015060.5.

JP Office Action with English translation for JP application No. 2021-203130, dated Nov. 30, 2022, 4 pages.

European Search Report for EP Application No. 21150799.1, dated Jul. 23, 2021.

\* cited by examiner

JOINT, ELECTRICAL FEEDTHROUGH, AND SENSOR

TECHNICAL FIELD

The present invention relates to a joint that connects an alloy member to a ceramic member by means of a glass joining agent with characteristic melting point, bismuth content and coefficient of thermal expansion. The invention also relates to an electrical feedthrough that includes this joint, and a sensor that includes at least one such electrical feedthrough.

BACKGROUND OF THE INVENTION

Temperature-resistant material bonded joints between different materials are required in a variety of industrial products. Generally, a material bonded joint between two members to be bonded to one another is formed for this purpose by means of a bonding agent. However, due to the different coefficients of thermal expansion, it is often difficult to achieve a temperature-resistant material bonded joint between a ceramic member and an alloy member consisting of a metal alloy, in the following shortly called "alloy," or of a metal or is severely restricted regarding the choice of material. In metallurgy, an alloy is defined as a material comprising at least two chemical elements at least one of which is a metal that together exhibit the property of metallic bonding. For clarity, the term metal alloy (or shortly "alloy" will be used in the following to refer to a pure metal or a metal alloy or other metallic material. If the joint is produced with the members to be joined brought to high temperatures, for example by soldering using a metal solder as the bonding agent at the melting temperature of the solder, strong forces will act on the joint at temperatures different from the melting temperature of the solder. These forces are also referred to as mechanical stress. The forces will change with any temperature change causing weakening of the joint upon temperature changes, which may lead to the formation of cracks or otherwise have a negative impact on the properties of the joint.

Temperature-resistant material bonded joints are often found in sensors, for example in electrical feedthroughs having a housing that is welded to the housing of the sensor or to the housing of the device. Typically, a metallic conductor is conducted directly through an insulating glass joining agent made of a glass. The glass joining agent is radially surrounded by a housing. For forming a joint between the housing as one member to be joined, and the conductor as the other member to be joined, a glass joining agent with hollow-cylindrical shape is frequently used. A well-known glass joining agent in commercially available feedthroughs is borosilicate glass. For forming the feedthrough, the borosilicate glass is melted at high temperatures of more than 800° C. and provides a material bonded joint to the members to be joined. This is known in the art as "vitrification".

Particularly due to the trend of continuing miniaturization, typical sensor housings are fabricated as thin-walled and as small as possible. Therefore, the materials used must be characterized by a fine-grained structure, wherein a fine-grained structure is understood to mean a material containing crystalline zones, also called grains, which grains have a small average grain size of less than 0.01 mm. The average grain size is determined by the method described in ASTM International Standard Test Method E112-10, DOI: 10.1520/E0112-10.

Especially force and pressure sensors frequently incorporate thin metallic membranes. Furthermore, such sensors also often incorporate thin-walled metallic preloading sleeves for mechanically preloading a measuring element with a preloading force by means of a preloading sleeve that is as thin-walled as possible. For this purpose, the preloading sleeves are often welded to a metallic sensor housing. For achieving a good welding joint, the sensor housing and the preloading sleeve are often made of the same material, even if the housing itself lacks any thin or delicate members or structures.

Sensors comprising thin-walled membranes are also known. Like the preloading sleeves, these are often welded to the sensor housing to achieve a tightly sealed joint for protecting the interior of the sensor from environmental impacts, for example as known from applicant's commonly owned U.S. Pat. No. 4,016,437 to Calderara et al, which patent is hereby incorporated herein in its entirety by this reference for all purposes. For this reason, such sensor housings are made of, for example, martensitic steels such as steels with EN material numbers 1.4542, 1.4534 or 1.4614. However, known electrical feedthroughs often have a housing made of 1.3981 grade steel which has an austenitic and, thus, coarse-grained structure. In the sense of the present document, coarse-grained is understood as having an average grain size of more than 0.01 mm.

Steel of EN 1.3981 material numbers exhibits a coefficient of thermal expansion similar to that of aluminum oxide and borosilicate glasses. However, the martensitic steels are characterized by a significantly higher coefficient of thermal expansion of 9 to $12 \cdot 10^{-6} \cdot K^{-1}$. This incompatibility between the martensitic steels and the EN 1.3981 material number steel results in a joint region between the steels that has a lower yield strength compared to that of the martensitic steels and leads to a crack tendency of a soldered or welded or other material bonded joint due to the difference in coefficients of thermal expansion of the members to be joined.

To prevent too much flowing of the glass joining agent employed in a material bonded joint and contamination of areas of the members to be bonded that are not in the proximity of the material bond, the so-called vitrification temperature must be just above the melting temperature of the glass joining agent. A contamination would prevent using these areas for further soldered or welded joints, for example. A vitrification temperature which is close to the melting temperature of the glass joining agent prevents unnecessary flowing of the bonding agent. To obtain material bonds that are free from pores and/or shrink holes, i.e. pore free and/or shrink hole free vitrifications, despite a processing temperature close to the melting point of the glass joining agent, the glass joining agent must be formed within a narrow tolerance band to achieve a good contact between the member to be bonded and the glass joining agent already prior to vitrification. In metallurgy, shrink holes are cavities in a volume that occur due to cooling and solidification of a melt. The glass joining agent must exhibit high geometrical tolerance. However, it may be difficult and involve a lot of effort to achieve such geometrical tolerance.

A material bonded joint is known from U.S. Pat. No. 3,638,076 to Koons, which patent is hereby incorporated herein in its entirety by this reference for all purposes, that is produced between members made of the metal tantalum and of ceramics, respectively, wherein the joint is achieved by using a joining means consisting of glass. Tantalum, ceramic and glass are selected in such a way that their coefficients of thermal expansion do not differ by more than $1.5 \cdot 10^{-6}$ K$^{-1}$. Because of its high melting temperature of over 3000° C., tantalum is unsuitable for many applications. Furthermore, tantalum also has a high tendency to oxidation so that it requires an inert environment during welding. Moreover, tantalum is expensive. The glass material disclosed in U.S. Pat. No. 3,638,076 further has a high melting point of over 900° C. Such high temperatures may in particular damage, for example irreversibly deform, thin metal members.

Temperature-resistant material bonds between different materials are also used in electrical insulation of metal surfaces by means of a ceramic. In these cases, a metal surface is material bonded to a planar ceramic.

OBJECTS AND SUMMARY OF THE INVENTION

It is an object of the present invention to produce a joint between a metallic material and a ceramic, which joint is temperature-resistant, may be produced at low cost and may be produced at low temperatures of not more than 800° C. It is another object of the invention to provide an electrical feedthrough which is temperature-resistant and may be produced at low cost.

These objects have been achieved by the features described hereinafter for a joint, an electrical feedthrough and related method of producing the foregoing.

When stating herein a percentage of a material, for example bismuth, contained in a mixture of materials, for example a glass, this is intended to mean a percentage by weight of the material contained with respect to the total weight of the mixture of materials.

As it is generally understood, a glass is intended to mean herein a material having a glass transition temperature at which a transition of a solid state of the glass to a rubber-like up to a viscous state occurs. Generally, viscous is defined as occurring at a viscosity of about $10^{12}$ Pa-s (Pascal seconds). Glass transition does not occur at a specific temperature but within a temperature range. The glass transition temperature is also referred to as glass temperature or transformation temperature.

Furthermore, a glass also exhibits a vitrification temperature where material bonds are formed. This vitrification temperature will be referred to as melting temperature hereinafter. Vitrification is also referred to as melting.

The alloy member exhibits a coefficient of thermal expansion of at least $9 \cdot 10^{-6}$ K$^{-1}$ and the glass joining agent containing a certain amount of bismuth exhibits a coefficient of thermal expansion of at least $9 \cdot 10^{-6}$ K$^{-1}$. All coefficients of thermal expansion mentioned herein refer to the coefficient of thermal expansion between room temperature of 25° C. and 100° C. unless otherwise stated. In particular, an alloy is a martensitic steel. Therefore, no difficulties are encountered regarding the coefficients of thermal expansion when the alloy member and the glass joining agent are combined. The ceramic member exhibits a maximum coefficient of thermal expansion of $8 \cdot 10^{-6}$ K$^{-1}$. Thus, the ranges of the coefficients of thermal expansion of the alloy member and the ceramic member do not overlap. The material bonded joint between the alloy member and the glass joining agent and between the ceramic member and the glass joining agent is achieved by melting the glass joining agent at least partially. The melted glass joining agent is contacted with the alloy member and the ceramic member, respectively. At least bismuth-containing portions of the glass joining agent are introduced into the ceramic member. The portion of the ceramic member in which the bismuth content detected in the ceramic member is higher compared to the that in the ceramic member before it is material bonded to the glass joining agent is referred to as the mixing region. In the mixing region, the coefficient of thermal expansion changes to match the coefficient of thermal expansion of the glass joining agent. This change in coefficient of thermal expansion of the mixing region to match the coefficient of thermal expansion of the glass joining agent at the interface between the mixing region and the glass joining agent reduces forces that occur during temperature changes as compared to the situation without this change in coefficient of thermal expansion which is achieved by introducing an amount of bismuth into the ceramic member. This is advantageous since a force acting at the interface between the ceramic member and the glass joining agent is lower than a force that would act if there were no mixing region in the ceramic member. This reduces the risk of damage to the material bond. The material bonded joint between the glass joining agent and the ceramic member is temperature-resistant up to close to the glass transition temperature of the glass joining agent.

The coefficients of thermal expansion of the alloy member and the glass joining agent are in good agreement so that upon a temperature change no or only minor forces occur at the material bonded joint between the alloy member and the glass joining agent. Therefore, the material bonded joint between the glass joining agent and the alloy member is temperature-resistant up to near the vitrification temperature of the glass joining agent.

A joint according to the invention between the alloy member and the ceramic member by means of the glass joining agent avoids cracking which might occur upon temperature changes in a joint between materials having different coefficients of thermal expansion.

In the context of the present invention, a temperature change is a change in temperature of the glass joining agent or the alloy member or the ceramic member or a change in temperature of a combination of the glass joining agent, ceramic member, alloy member by at least 10° C. over a period of seconds to days. A temperature change is a repeatedly occurring temperature change between at least two temperatures.

BRIEF DESCRIPTION OF THE SEVERAL VIEWS OF EXEMPLARY DRAWINGS

Figure 2:
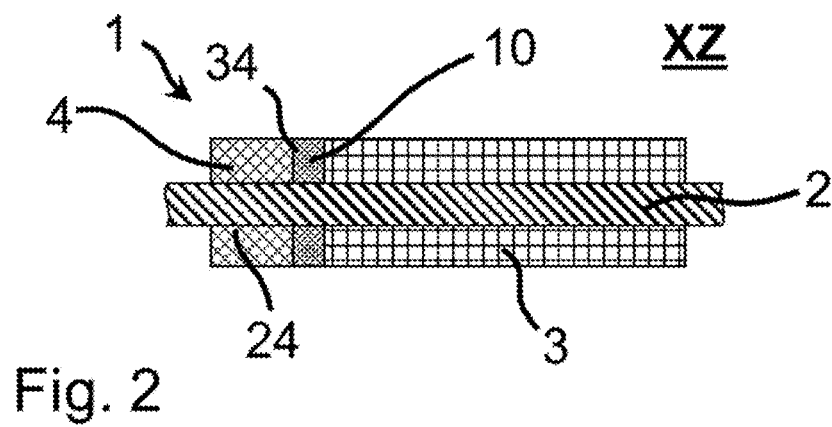
Figure 3:
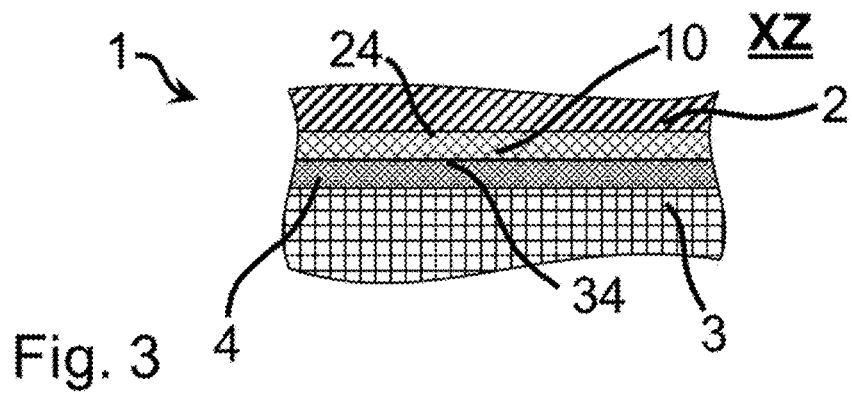
Figure 4:
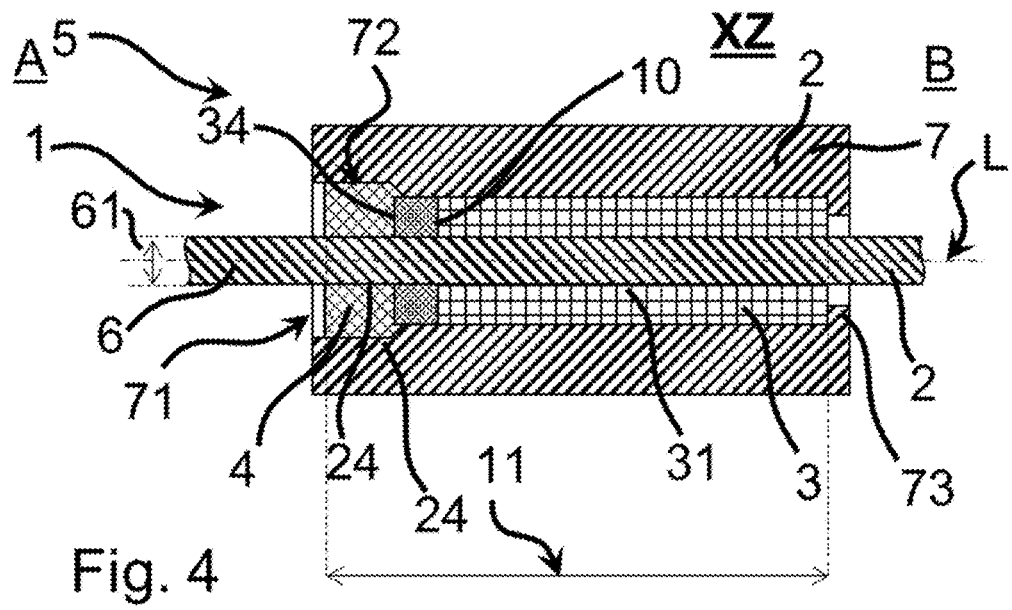
Figure 5:
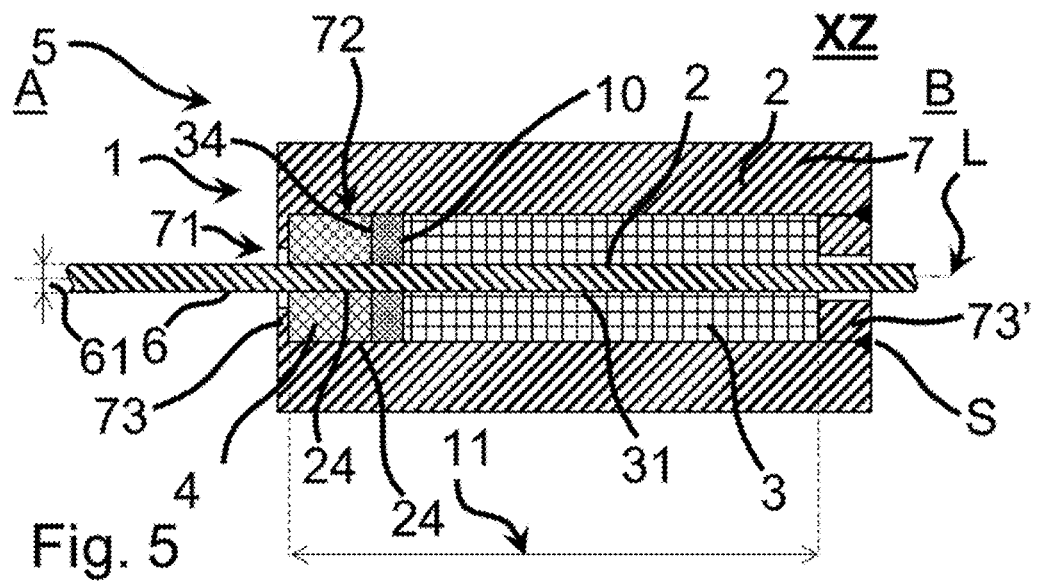
Figure 6:
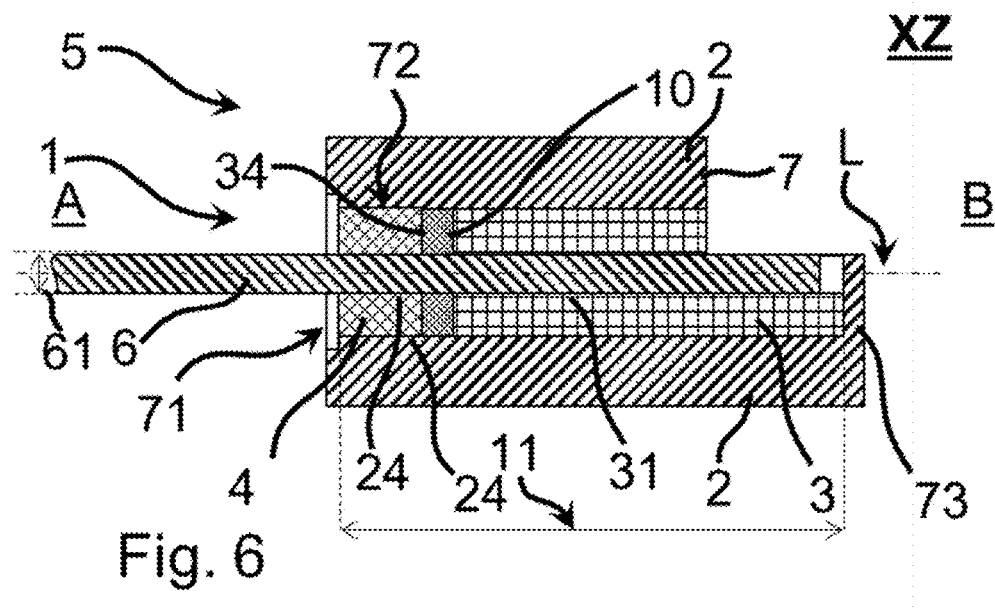
Figure 7:
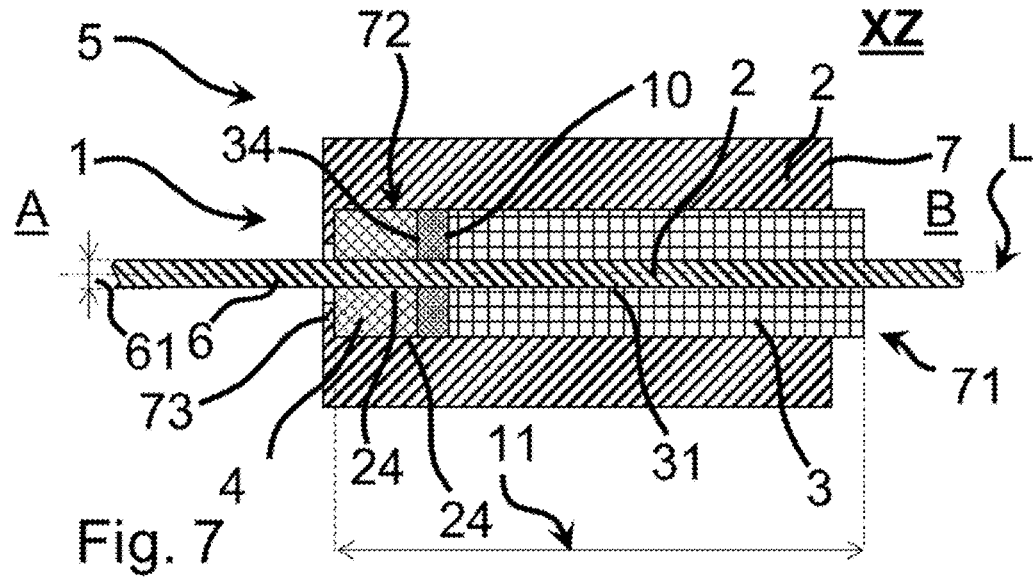
Figure 8:
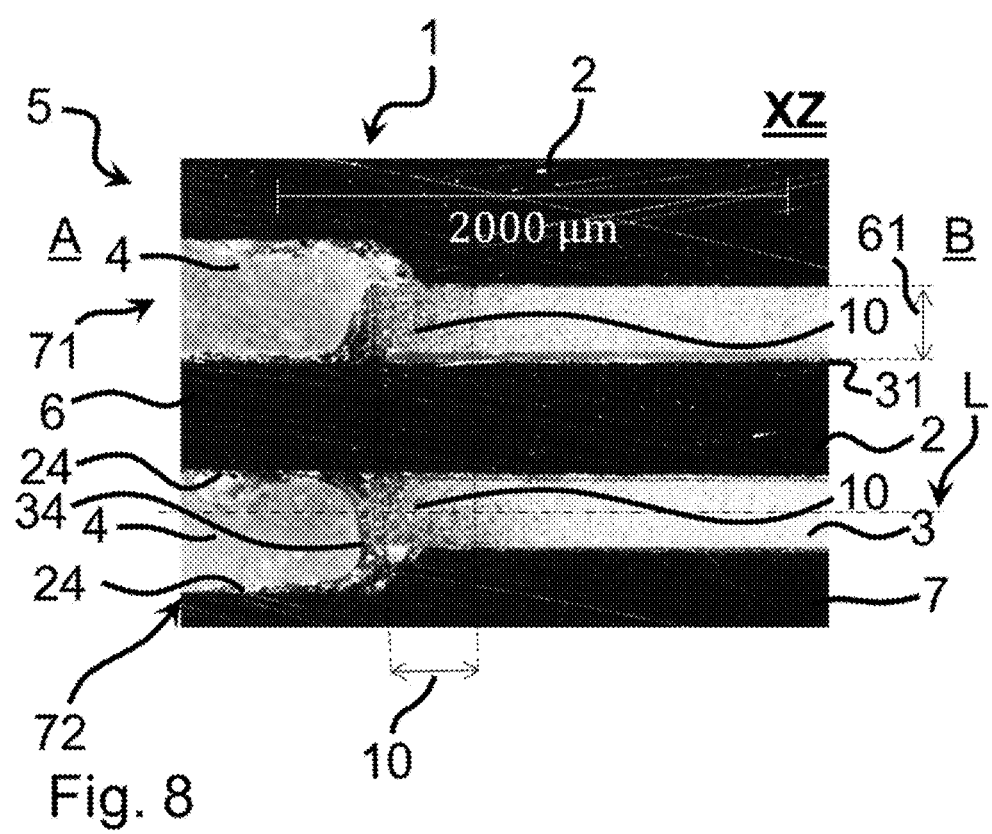
Figure 9:
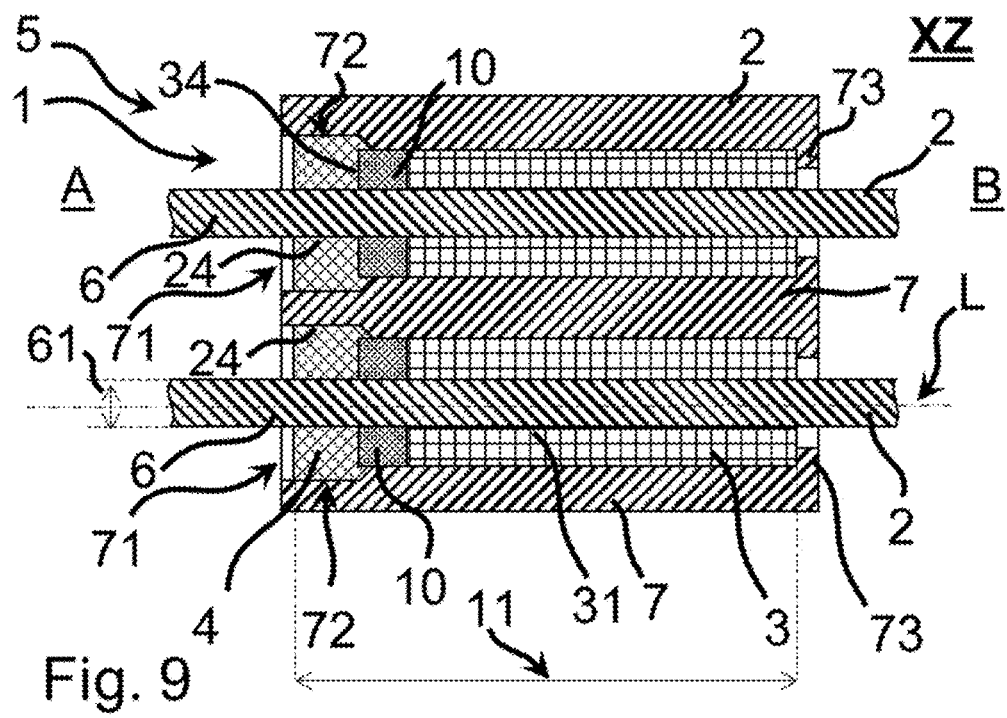
Figure 10:
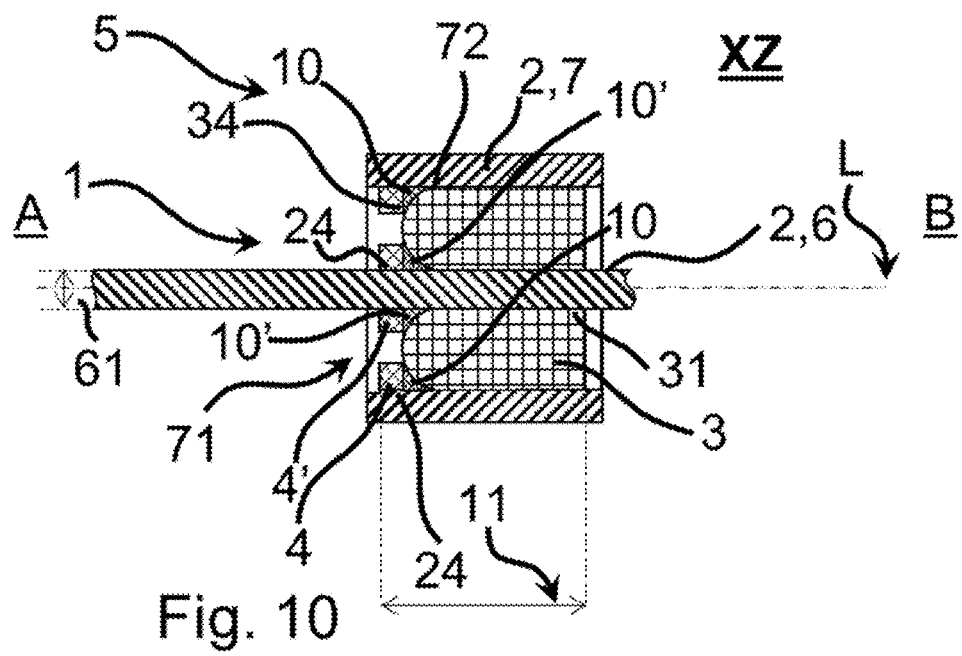
Figure 11:
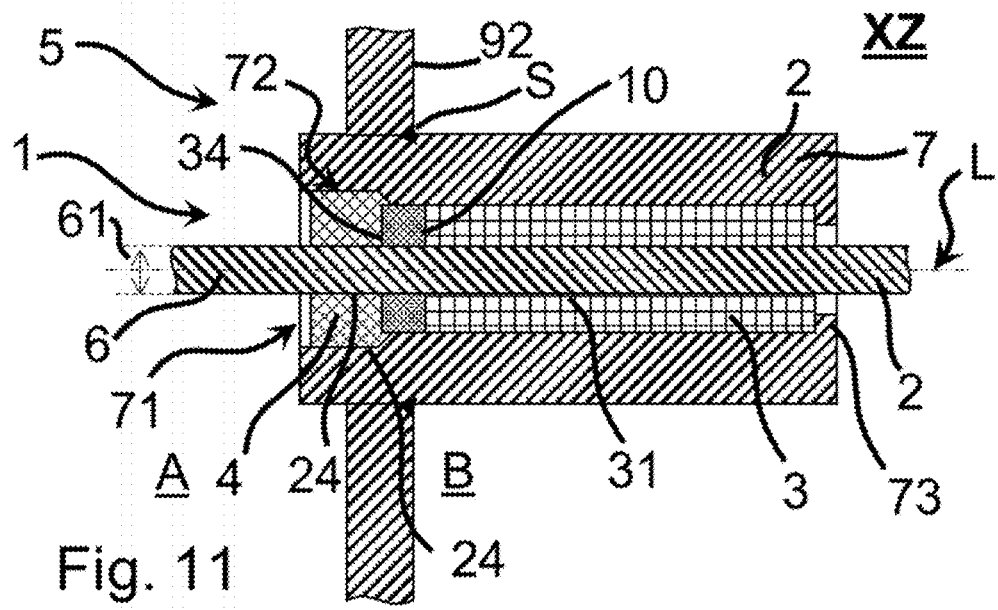
Figure 12:
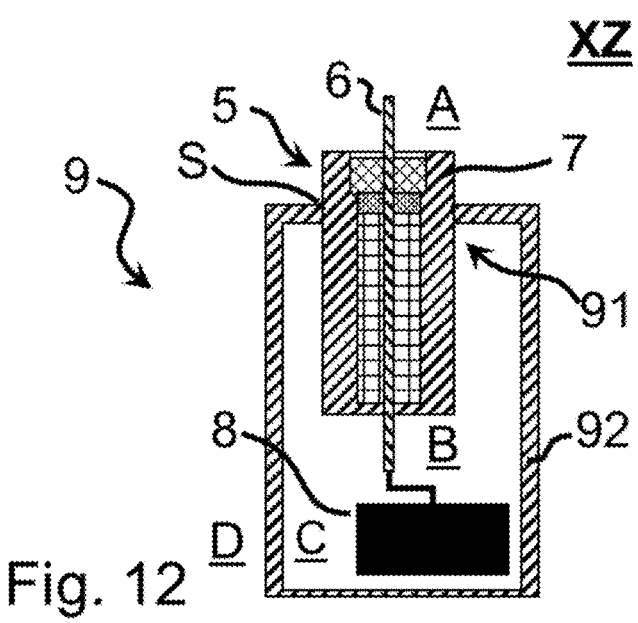
Figure 13:
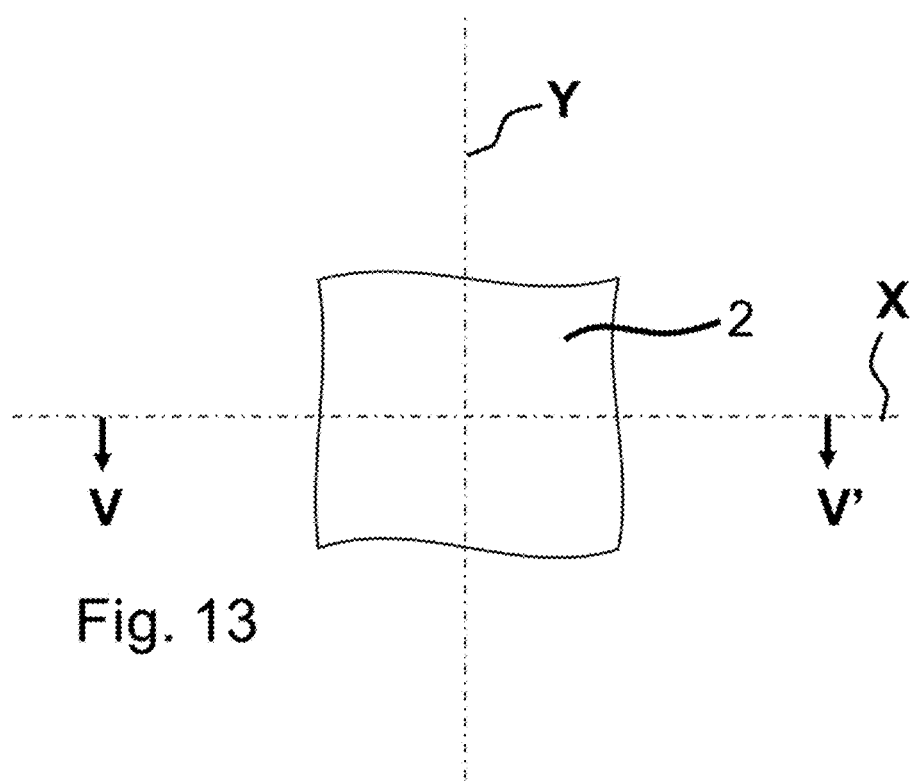
Figure 14:
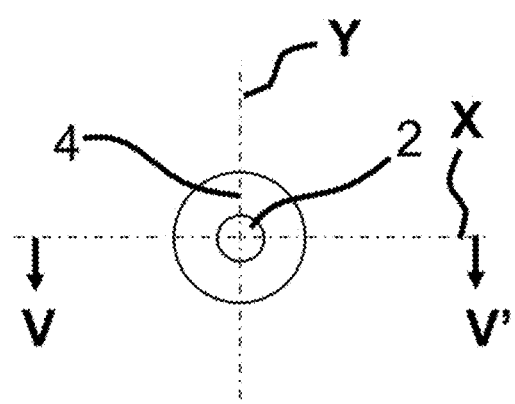
Figure 15:
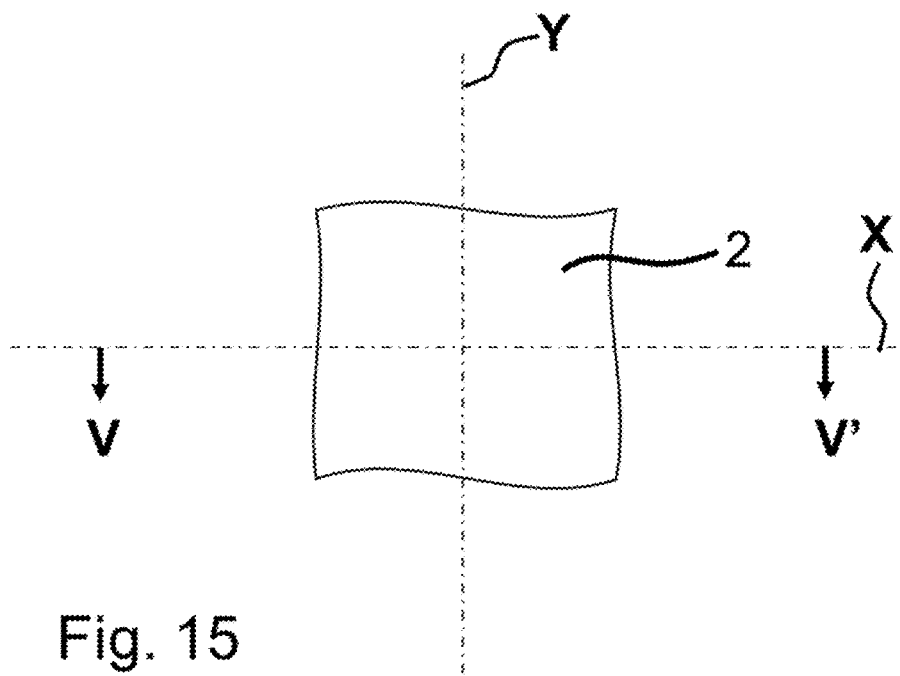
Figure 16:
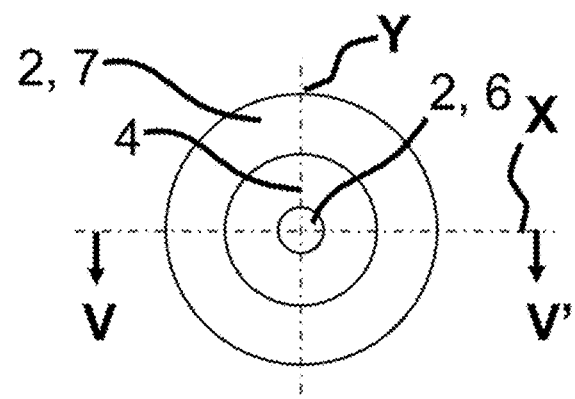
Figure 17:
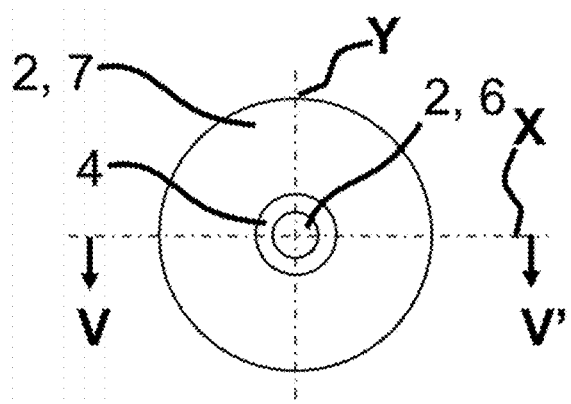
Figure 18:
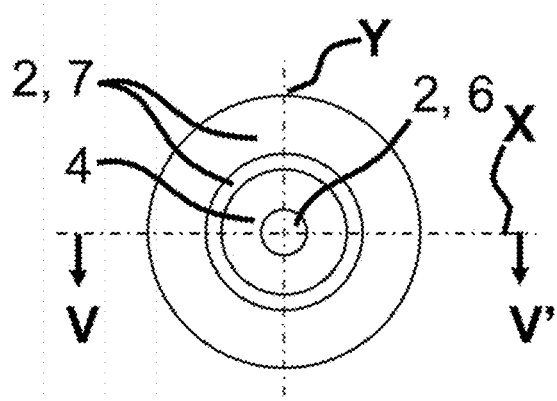
Figure 19:
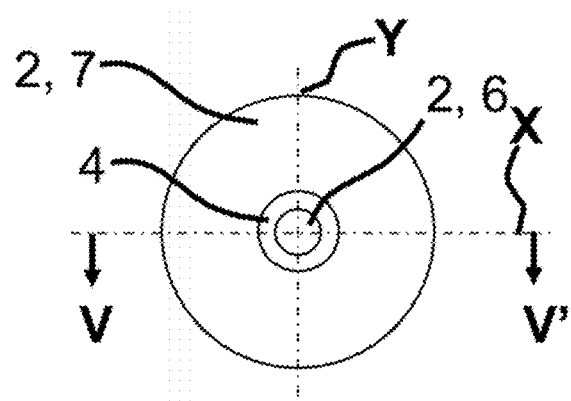
Figure 20:
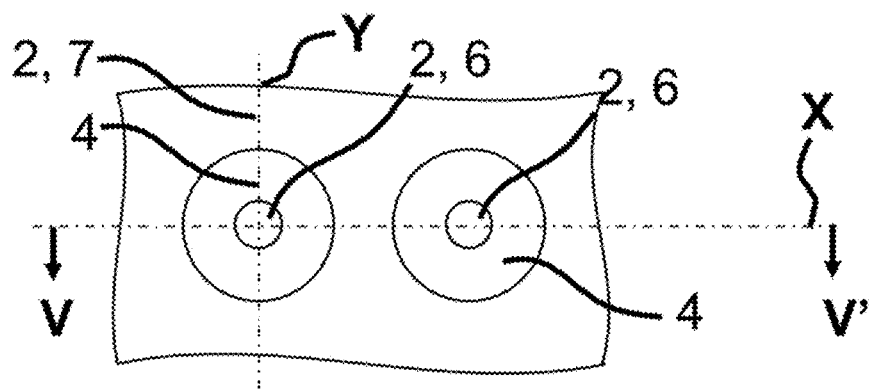
Figure 21:
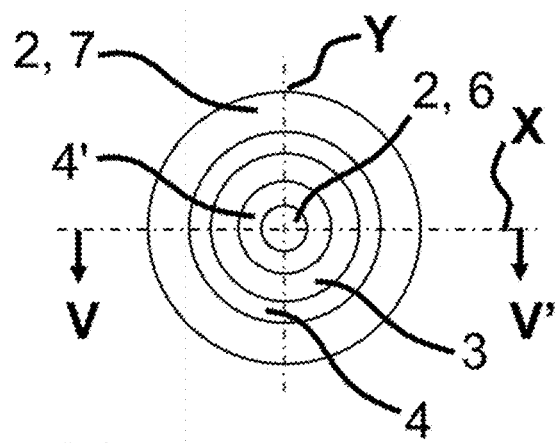
Figure 22:
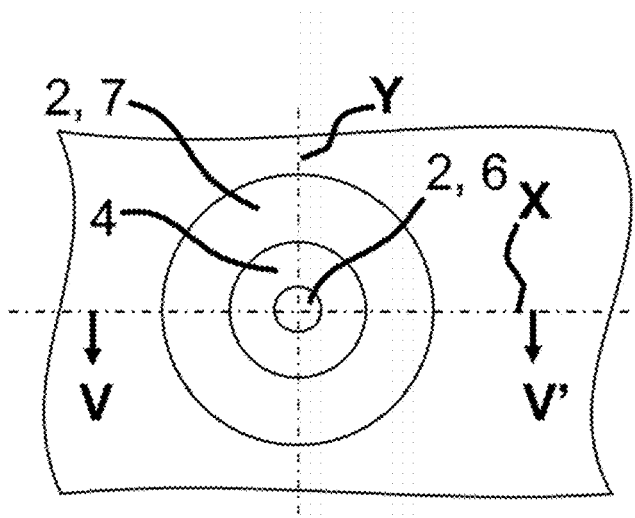
Figure 23:
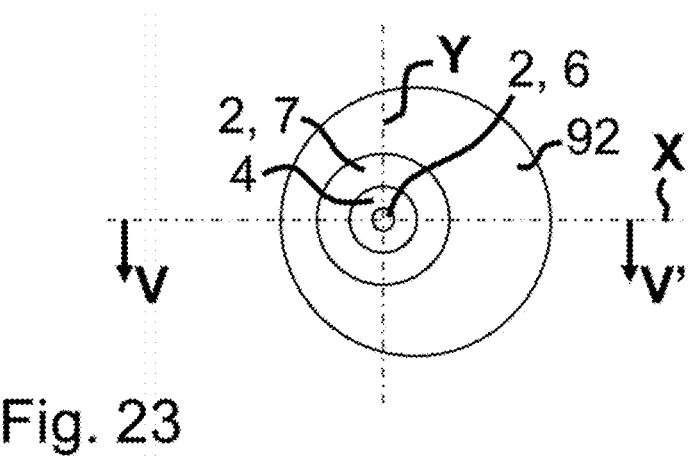

In the following, the invention is explained in more detail by way of example with reference to the Figures in which:

FIG. 1 shows a schematic representation of a cross sectional view taken of an embodiment of a joint cut in the XZ plane in the direction of the arrows designated V-V' in FIG. 13, FIG. 2 shows a schematic representation of a cross sectional view taken of an embodiment of a joint cut in the XZ plane in the direction of the arrows designated V-V' in FIG. 14, FIG. 3 shows a schematic representation of a cross sectional view taken of an embodiment of a joint cut in the XZ plane in the direction of the arrows designated V-V' in FIG. 15, FIG. 4 shows a schematic representation of a cross sectional view taken of an embodiment of an electrical feedthrough cut in the XZ plane in the direction of the arrows designated V-V' in FIG. 16, FIG. 5 shows a schematic representation of a cross sectional view taken of an embodiment of an electrical feedthrough cut in the XZ plane in the direction of the arrows designated V-V' in FIG. 17, FIG. 6 shows a schematic representation of a cross sectional view taken of an embodiment of an electrical feedthrough cut in the XZ plane in the direction of the arrows designated V-V' in FIG. 18, FIG. 7 shows a schematic representation of a cross sectional view taken of an embodiment of an electrical feedthrough cut in the XZ plane in the direction of the arrows designated V-V' in FIG. 19, FIG. 8 shows a cross sectional view taken of an embodiment of an electrical feedthrough cut in the XZ plane in a manner similar to what is depicted schematically in FIG. 7, FIG. 9 shows a schematic representation of a cross sectional view taken of an embodiment of an electrical feedthrough cut in the XZ plane in the direction of the arrows designated V-V' in FIG. 20, FIG. 10 shows a schematic representation of a cross sectional view taken of an embodiment of an electrical feedthrough cut in the XZ plane in the direction of the arrows designated V-V' in FIG. 21, FIG. 11 shows a schematic representation of a cross sectional view taken of an embodiment of an electrical feedthrough cut in the XZ plane in the direction of the arrows designated V-V' in FIG. 22, FIG. 12 shows a schematic representation of a cross sectional view taken of an embodiment of a sensor cut in the XZ plane in the direction of the arrows designated V-V' in FIG. 23, FIG. 13 shows a schematic representation of a top plan view in the X-Y plane of the embodiment of a joint shown in cross-section in FIG. 1, FIG. 14 shows a schematic representation of a top plan view in the X-Y plane of the embodiment of a joint shown in cross-section in FIG. 2, FIG. 15 shows a schematic representation of a top plan view in the X-Y plane of the embodiment of a joint shown in cross-section in FIG. 3, FIG. 16 shows a schematic representation of a top plan view in the X-Y plane of the embodiment of an electrical feedthrough shown in cross-section in FIG. 4, FIG. 17 shows a schematic representation of a top plan view in the X-Y plane of the embodiment of an electrical feedthrough shown in cross-section in FIG. 5, FIG. 18 shows a schematic representation of a top plan view in the X-Y plane of the embodiment of an electrical feedthrough shown in cross-section in FIG. 6, FIG. 19 shows a schematic representation of a top plan view in the X-Y plane of the embodiment of an electrical feedthrough shown in cross-section in FIG. 7, FIG. 20 shows a schematic representation of a top plan view in the X-Y plane of the embodiment of an electrical feedthrough shown in cross-section in FIG. 9, FIG. 21 shows a schematic representation of a top plan view in the X-Y plane of the embodiment of an electrical feedthrough shown in cross-section in FIG. 10, FIG. 22 shows a schematic representation of a top plan view in the X-Y plane of the embodiment of an electrical feedthrough shown in cross-section in FIG. 11, FIG. 23 shows a schematic representation of a top plan view in the X-Y plane of the embodiment of a sensor shown in cross-section in FIG. 12.

DETAILED DESCRIPTION OF EXEMPLARY EMBODIMENTS OF THE INVENTION

FIG. 1 shows a schematic partial cross-sectional view of a potential embodiment of a joint 1.

A joint 1 is the joint between an alloy member 2 and a ceramic member 3 produced by means of a glass joining agent 4. The glass joining agent 4 and the alloy member 2 are joined by a material bonded joint 24. Furthermore, the glass joining agent 4 and the ceramic member 3 are joined by a material bonded joint 34. The glass joining agent 4 has a melting point of less than 800° C. The material bonds 24, 34 to the alloy member 2 and the ceramic member 3, respectively, are formed at a temperature just above the melting temperature of the glass joining agent 4. Hereinafter, low temperatures are understood to mean temperatures 800° C. or below 800° C., while high temperatures are understood to mean temperatures above 800° C. The low melting temperature of the glass joining agent 4 is achieved by an amount of bismuth of at least 10% contained in the glass joining agent 4.

The low melting temperature of the glass joining agent 4 reduces mechanical stress on the ceramic member 3 and the alloy member 2. Thus, the present invention avoids mechanical stress that may be caused by linear expansion in material bonds with, for example, borosilicate glasses having high melting temperatures. The longitudinal expansion of each of the ceramic member 3 involved and the alloy member 2 involved and the glass joining agent 4 is temperature-dependent according to different coefficients of thermal expansion. Therefore, a linear expansion and, thus, a difference in linear expansion between the glass joining agent 4 and the ceramic member 3 or alloy member 2, is smaller when performed at a low temperature compared to using a high temperature for producing the joint 1. Thus, when the ceramic member 3 and the alloy member 2, which are joined by means of the glass joining agent 4, are components that are used at different temperatures, for example room temperature or temperatures in the negative range of the Celsius scale, after they were material bonded 24, 34 to one another by the glass joining agent 4 in the joint 1, then the relative difference in linear expansion of the ceramic member 3 and the alloy member 2 having different coefficients of thermal expansion regarding the above-mentioned high temperature will further be smaller than in the case of material bonded joints which have to be produced at high temperatures.

According to the invention, joint 1 comprises a mixing region 10. The mixing region 10 comprises a certain amount of bismuth. The mixing region 10 is a partial region of the ceramic member 3.

The bismuth content in the ceramic member 3 before the material bonded joint 34 with the glass joining agent 4 is formed, is lower than the bismuth content in the mixing region 10. Thus, the bismuth content in the ceramic member 3 may be zero or too low to be detected at a time before the material bonded joint 34 is formed. Bismuth may be detected, for example, by generally known X-ray fluorescence measurements or X-ray absorption measurements. However, well-known material analysis techniques such as secondary ion mass spectrometry (SIMS) may also be used for detecting bismuth.

The bismuth content in the mixing region 10 is higher than that of the ceramic member 3 outside of the mixing region 10.

The mixing region 10 is located in spatial proximity to the glass joining agent 4. FIGS. 1 to 3 show cross-sectional views of three different embodiments of a joint 1, and FIGS. 13-15 show schematic representations of top plan views thereof.

The coefficient of thermal expansion of the alloy member 2 is at least $9 \cdot 10^{-6}$ $K^{-1}$ and the coefficient of thermal expansion of the glass joining agent 4 containing an amount of bismuth is at least $9 \cdot 10^{-6}$ $K^{-1}$. Therefore, the coefficients of thermal expansion allow for the formation of a material bonded joint 24 between the alloy member 2 and glass joining agent 4.

The maximum coefficient of thermal expansion of the ceramic member 3 is $8 \cdot 10^{-6}$ $K^{-1}$. The coefficient of thermal expansion of the ceramic member 3 is increased by introducing an amount of bismuth into a partial region of the ceramic member, the so-called mixing region 10. Thus, in the mixing region 10 containing an increased amount of bismuth, the coefficient of thermal expansion is higher than in the ceramic member 3 outside of the mixing region 10 where the amount of bismuth is not increased. Due to the introduction of bismuth into the mixing region 10 of the ceramic member 3, the coefficient of thermal expansion of the mixing region 10 gets closer to the coefficient of thermal expansion of the glass joining agent 4 and the coefficient of thermal expansion of the alloy member 2.

The mixing region 10 reduces mechanical stresses occurring at the interface between the ceramic member 3 and the glass joining agent 4 compared to a joint 1 without mixing region 10 since some of the stress now occurs within the mixing region 10 and, thus, within a partial region of the ceramic member 3. However, mechanical stress there has no negative impact on the material bonded joint 34 between the ceramic member 3 and the glass joining agent 4.

In one embodiment, the amount of bismuth contained in the mixing region 10 gradually increases towards the glass joining agent 4. It has been shown that the coefficient of thermal expansion of the ceramic member depends on the bismuth content. In the mixing region 10, the coefficient of thermal expansion increases with an increasing amount of bismuth. As a result, the coefficient of thermal expansion in the mixing region 10 being in spatial proximity to the glass joining agent 4 approaches that of the glass joining agent 4. The coefficient of thermal expansion in the mixing region 10 gradually approaches that of the glass joining agent 4, and mechanical stresses occurring upon a temperature change of the material bonded joint 34 and the corresponding forces are distributed across the entire mixing region 10. A smaller force acts at the interface between the ceramic member 3 and the glass joining agent 4 compared to a force that would act between the alloy member 2 and the ceramic member 3 in the absence of a mixing region 10 in the ceramic member 3.

Advantageously, for gradually matching the coefficient of thermal expansion in the mixing region 10 with the coefficient of thermal expansion in the glass joining agent 4, there should be an abrupt decrease in bismuth content at the interface between the glass joining agent 4 and the mixing region 10. The interface between the glass joining agent 4 and the mixing region 10 is defined by the presence of ceramic material in the mixing region 10, while ceramic material is absent in the glass joining agent 4. Since the dependence of the coefficient of thermal expansion on the bismuth content in the mixing region 10 is different from the dependence of the coefficient of thermal expansion on the bismuth content of the glass joining agent 4, the bismuth content must be lower in the mixing region 10 compared to the bismuth content in the glass joining agent 4 for obtaining a match of the coefficients of thermal expansion at the interface between the mixing region 10 and the glass joining agent 4. Therefore, the bismuth content in the mixing region 10 advantageously is such that the bismuth content at the interface between the glass joining agent 4 and the mixing region 10 decreases abruptly. An abrupt change in a bismuth content is a relative change in this bismuth content of more than 5% within a distance of 0.001 mm.

Advantageously, the mixing region 10 has a spatial extension of at least 0.001 mm from the joining means 4. Thus, the boundary of the spatial extension of the mixing region 10 on the one hand is the spatial extension of the ceramic member 3. Therefore, the spatial extension of the ceramic member 3 also delimits the mixing region from the glass joining agent 4 immediately adjacent thereto. The extension of the mixing region 10 is measured in a perpendicular direction from the interface to the glass joining agent 4 in the ceramic member 3. Another boundary of the mixing region 10 is defined where the bismuth content in the ceramic member 3 is less than or equal to 1/e of the bismuth content in the ceramic member 3 immediately adjacent to the glass joining agent 4. The value 1/e is the reciprocal of Euler's number. The bismuth content in the ceramic member 3 immediately adjacent to the glass joining agent 4 is the bismuth content within the first 0.0005 mm of the ceramic member 3 at the interface between the glass joining agent 4 and the ceramic member 3. Thus, the mixing region 10 is a partial region of the ceramic member 3. The spatial extension of the mixing region 10 of at least 0.001 mm is advantageous since forces that occur upon a change in temperature of the material bonded joint 34 are distributed across the entire mixing region 10. The spatial extension of the mixing region 10 may be adjusted by the vitrification temperature and the duration of the vitrification period. An extension of more than about 1.0 mm is not necessary as such an enlarged extension of the mixing region 10 does not result in any significant improvement with respect to the durability of the joint 1, while the energy input required for vitrification and the duration of the vitrification period is unnecessarily increased.

In one embodiment, the glass joining agent 4 is free of lead. Lead-containing solder glasses and their properties are well-known. However, the harmful effects lead has on biological organisms are widely known. For this reason, the use of lead in electrical and electronic components is prohibited in certain cases, for example by Directive 2011/65/ EU of the European Parliament and the Council of Jun. 8, 2011 on the restriction of the use of certain hazardous materials in electrical and electronic equipment) (RoHS). It is possible, though, to prepare a glass joining agent 4 according to the invention without lead. This has the advantage that the glass joining agent 4 complies with Directive 2011/65/EU. In accordance with Directive 2011/65/EU, the term "free of lead" refers to a lead content of less than 0.1% by weight.

The glass joining agent 4 is made of a glass having a melting temperature below 800° C. For forming a material bonded joint 34 between the glass joining agent 4 and the ceramic member 3 or a material bonded joint 24 between the glass joining agent 4 and the alloy member 2, at least a portion of the glass joining agent 4 and at least a portion of the alloy member 2 or the ceramic member 3, respectively, exhibits the melting temperature of the glass joining agent 4 for at least a few milliseconds. In comparison to conventional material bonds made with borosilicate glass joining agents that exhibit high melting temperatures, a low melting temperature of the bismuth-containing glass joining agent 4 has the advantage that the linear expansion of the glass joining agent 4 and the alloy member 2 or ceramic member 3 regarding room temperature is lower than at high temperatures. This results in a reduction of potential mechanical stresses at temperatures below the melting temperature of the glass joining agent 4.

In one embodiment, the bismuth content in the glass joining agent 4 is selected to obtain a melting temperature that preferably is lower than 650° C. In addition to the advantage mentioned above, temperatures lower than 650° C. also enable any heat impact to be minimized, for example by heat conduction within the ceramic member 3 or alloy member 2 or by convection or by thermal radiation, on components located close to the joint 1 and, thus, to prevent aging or damaging of the components or the alloy member 2 or ceramic member 3.

For example, a glass suitable as glass joining agent 4 is one that comprises more than 50% $Bi_2O_3$, 1% to 10% $B_2O_3$, 10% to 50% ZnO, 1% to 10% $SiO_2$, 0.1% to 1% $Al_2O_3$ and accordingly exhibits a vitrification temperature of about 520° C. For example, another glass suitable as glass joining agent 4 is one that comprises more than 50% $Bi_2O_3$, 1% to 10% $B_2O_3$, 1% to 10% ZnO, 0.1% to 1% $CeO_2$ and accordingly exhibits a vitrification temperature of about 620° C. Furthermore, a glass suitable as glass joining agent 4 is one that comprises more than 50% $Bi_2O_3$, 1% to 10% $B_2O_3$, 1% to 10% ZnO, 0.1% to 1% $CeO_2$, 0.1% to 1% $ZrO_2$ to yield a vitrification temperature of the glass joining agent 4 that ranges from about 450° C. to about 500° C.

In one embodiment, the ceramic member 3 is electrically insulating. Electrically insulating as defined herein are materials having a resistivity of at least $10^9$ Ω·cm at room temperature. The electrically insulating ceramic member 3 is advantageous for electrical applications in which an electric current conducting alloy member 2 is electrically insulated from its environment by an electrically insulating ceramic member 3. Suitable materials for an electrically insulating ceramic member 3 are, for example, ceramics containing at least 70% aluminum oxide, or at least 70% zirconium oxide, or at least 70% silicon oxide, or at least 70% yttrium oxide or at least 70% of a mixture of these materials. For applications requiring high insulation, a content of the aforementioned materials of at least 95% is preferred. One such application is the use of piezoelectric measuring elements which generate piezoelectric charges under the impact of a force. The piezoelectric charges of the measuring elements must be obtained with as little loss of these charges as possible for measurement accuracy. It has been found that for cost effectiveness, a joining member made of ceramic 3 comprising 80% to 98% aluminum oxide and having a coefficient of thermal expansion of about $6\text{--}10^{-6}$ $K^{-1}$ is particularly advantageous.

The ceramics used may have a polycrystalline and/or single crystalline structure. An example of a single crystalline structure is sapphire.

In one embodiment, the alloy member 2 has a polycrystalline microstructure. A polycrystalline microstructure is intended to mean a microstructure having multiple crystalline zones with different orientations of the crystalline lattice. These crystalline zones are also known to those skilled in the art as crystalline grains. These grains have dimensions, the so-called grain size, which may be determined according to ASTM International Standard Test Method E112-10. For alloys having polycrystalline structures, the average grain size is an important property. It has been found that for membranes, housings, preloading sleeves, and other metallic components sometimes having small geometric dimensions of below 0.1 mm to be produced precisely, the average grain size must be smaller than the geometric dimension. Geometric dimensions of metallic components in the range of 0.10 mm to 0.02 mm are often encountered in electronic and electrotechnical applications. Thus, an alloy having a polycrystalline structure with an average grain size of less than 0.01 mm is preferred for the alloy member 2.

In one embodiment, the alloy member 2 is a martensitic steel. Martensitic steels are advantageous because they have a fine-grained microstructure with an average grain size of less than 0.01 mm and, thus, allow structures in produced parts or components having a thickness similar to the grain size. This is particularly advantageous for thin electric current conducting members in electronics, electrical engineering or precision mechanics. A martensitic steel is, for example, any of the steels with EN material numbers 1.4542, 1.4534 or 1.4614.

The invention further encompasses an electrical feedthrough 5 comprising at least one joint 1 wherein the joint 1 is a joint produced by means of a glass joining agent 4 between an alloy member 2 and a ceramic member 3, the ceramic member 3 comprising a mixing region 10 as already described above.

As schematically shown in the cross-sectional views of FIGS. 4-9 and corresponding schematic representations of top plan views shown in FIGS. 16-20, an electrical feedthrough 5 comprises a housing 7, which in the context of the joint 1 corresponds to an alloy member 2. FIG. 8 is a photo of a cross-section of a portion of a feedthrough schematically shown in FIG. 7. In FIG. 8, the solid black portion in the middle is the electrical conductor 6, while the solid black portions at the top and bottom are the housing 7. Housing 7 defines an opening 71 formed along a longitudinal axis L. Opening 71 is defined through an opening wall 72 of the housing 7. The opening wall 72 surrounds an elongated electrical conductor 6 at least in certain surface areas along the longitudinal axis L of the electrical conductor 6.

In the following description, an electrical conductor 6 will be referred to in a shortened form as conductor 6. Conductor 6 is electrically insulated from the opening wall 72. Conductor 6 has no direct contact with the opening wall 72. In the context of the joint 1, the conductor 6 is an alloy member 2. At least one ceramic member 3 is arranged at least partially within the opening 71 wherein the ceramic member 3 radially encloses the conductor 6 at least in certain surface areas of the electrical conductor 6 along the longitudinal axis L. Opening 71 has a circular cross-section, for example, and the circular cross-section extends along the longitudinal axis L. In this case, the ceramic member 3 is for example hollow cylindrical in shape with the cylinder axis extending along the longitudinal axis L and with a central opening 31 for example with a circular cross-section. Conductor 6 is arranged in the opening 31 of the ceramic member 3 and has a cross-section that is substantially equal to the cross-section of the opening 31 of the joining member. However, a rectangular or polygonal or any other cross-section of the aforementioned openings 31,71 and alloy members 2, ceramic members 4, conductors 6 is of course also possible.

A glass joining agent 4 is arranged in the opening 71 adjacent to the ceramic member 3. The glass joining agent 4 radially surrounds the conductor 6 at least in certain surface areas of the conductor 6 along the longitudinal axis L. The glass joining agent 4 is directly adjacent to the ceramic member 3. The glass joining agent 4 may be hollow-cylindrical in shape, as may be the ceramic member 3. When the glass joining agent 4 is hollow-cylindrical in shape, the ceramic member 3 and the glass joining agent 4 abut against one another with the end faces of the hollow cylinder.

Conductor 6 and ceramic member 3 are joined by a joint 1 as already described above by means of the glass joining agent 4. Joint 1 is the joint produced between an alloy member 2, in this case the conductor 6, and the ceramic member 3 by means of the glass joining agent 4. The glass joining agent 4 is connected to the conductor 6 by a material bonded joint 24. Furthermore, the glass joining agent 4 is connected to the ceramic member 3 by a material bonded joint 34. The glass joining agent 4 has a melting point below 800° C. As already described, the bismuth content of the glass joining agent 4 is at least 10%.

The opening wall 72 and the ceramic member 3 are joined by another joint 1 as described above by means of the glass joining agent 4.

Conductor 6 and opening wall 72 are joined to the same ceramic member 3 wherein the ceramic member 3 electrically insulates the conductor 6 from the opening wall 72. Potential embodiments of the electrical feedthrough 5 are shown in FIGS. 4 to 9. Furthermore, the two joints 1 may comprise features of the embodiments described above. In particular, the joints 1 may comprise a combination of features of the embodiments of the joints 1 described above.

In the embodiments shown in the cross-sectional views of FIGS. 4 to 9, joint 1 between the ceramic member 3 and the conductor 6 and opening wall 72 is achieved by a glass joining agent 4 made of one piece. Preferably, the glass joining agent 4 is a sintered body. A sintered body is a body produced by pressing, for example under pressure, a fine-grained starting material, for example glass powder, and subsequently heating it to a sintering temperature, or by pressing, for example under pressure, and simultaneously heating to a sintering temperature followed by cooling so that the shape of the body is retained but the powder is bonded to form a solid body. Sintered bodies may be produced also by extrusion technology and sintering. In each case, the sintering temperature remains below the melting temperature of the glass joining agent 4.

In another embodiment as shown in a cross-sectional view in FIG. 10 and in a schematic representation of a top plan view in FIG. 21, joint 1 between the ceramic member 3 and the conductor 6 is produced by means of a glass joining agent 4. In addition, joint 1 between the ceramic member 3 and the opening wall 72 is produced by means of a glass joining agent 4'. In both cases, the ceramic member 3 comprises a mixing region 10,10', respectively, adjacent to the glass joining agent 4. It is not necessary that the glass joining agents 4, 4' described in this embodiment according to FIG. 10 have the same glass composition.

The electrical feedthrough 5 is suitable for conducting electrical charges from a first region A to a second region B. In one embodiment, the first region A is tightly sealed from the second region B. Tightly sealed in this context refers to a joint 1 having a leakage rate of less than $10^{-5}$ Pa·m$^3$·s$^{-1}$ for helium. The determination of the leakage rate may be carried out as described in DIN EN 1779.

The tight seal of the electrical feedthrough 5 is preferably not affected by permanent or temporary temperatures up to 350° C. A temperature of 350° is below the vitrification temperature of the materials that may be used for a glass joining agent 4. This is advantageous when using the electrical feedthrough 5 for high-temperature applications above 350° C., for example in internal combustion engines. For high-temperature applications, an end member 73 is provided as schematically shown in FIGS. 4-7, 9 and 11 for example to promote structural integrity of the electrical feedthrough 5. If forces act on the ceramic member 3 along the longitudinal axis L, the ceramic member 3 will be supported on the end member 73. Such forces occur, for example, when a pressure is applied to the first region A or the second region B. The end member 73 is configured desirably as a taper of the opening 71, which taper reduces the opening 71 in such a way that a cross-section of the opening 71 is at least in part smaller than a cross-section of the ceramic member 3, as shown in FIGS. 4 to 7 and 9.

The ceramic member 3 may be in direct contact with the end member 73, as shown in the cross-sectional views of the embodiments of FIGS. 4, 6, and 9. The ceramic member 3 may also abut against the end member 73 with the interposition of the glass joint means 4, as shown in the cross-sectional view of the embodiment of FIG. 7.

In the embodiment shown in the cross-sectional view of the FIG. 5, a further end member 73' is provided in addition to the end member 73 so that the ceramic member 3 both abuts against the end member 73' and the end member 73, in each case with the glass joining agent 4 interposed therebetween. The further end member is joined to the housing 7, for example by means of a weld S, so that it is possible to insert the glass joining agent 4, ceramic member 3 and conductor 6 in the opening 71 of the housing 7 in advance.

Using an end member 73, 73' is advantageous for structural integrity and thus for tightness of the joint 1. Indeed, the glass joining agent 4 may have a lower strength at temperatures above 350° C. than at room temperature. When at the same time forces act on the ceramic member 3 along the longitudinal axis L, damage to the joint 1 may occur. This damage does not occur when these forces are dissipated by the end member 73. Those skilled in the art will select one of the embodiments described above according to the direction of the forces to be expected along the longitudinal axis L.

The electrical feedthrough 5 comprises an insulation path 11 as schematically shown in the cross-sectional views of FIGS. 4-7, 9 and 10. The insulation path 11 is defined along the longitudinal axis L at those positions where the conductor 6 is radially enclosed along the longitudinal axis L by the ceramic member 3 and the glass joint means 4 within the opening 71. Thus, the insulation path 11 of conductor 6 along the longitudinal axis L is radially enclosed by the ceramic member 3 and the glass joining agent 4. In one embodiment, the ratio between the length of the insulation path 11 and the conductor diameter 61 is greater than three. This has the advantage that the electrical feedthrough 5 is insensitive to leverage forces acting perpendicularly to the longitudinal axis L since the conductor 6 is radially supported over the entire insulation path 11 by the opening wall 72.

Advantageously, housing 7 is made of one of the steels 1.4542, 1.4534 or 1.4614. Likewise, conductor 6 is advantageously made of one of the steels 1.4542, 1.4534 or 1.4614. Thus, housing 7 is advantageously made of steel 1.4542 as it has good machinability. Good machinability means a machinability that is better than, for example, that of tantalum used in the prior art. Steel 1.4534 also exhibits good machinability. In this sense, while steel 1.4614 can be said to exhibit good machinability, the machinability of steel 1.4614 is not as good as the machinability of steels 1.4542 and 1.4534. Furthermore, conductor 6 is advantageously made of steel 1.4542. However, it is also possible to make the conductor from another one of the above-mentioned steels, for example steel 1.4614, which does not exhibit as good machinability as the machinability of steels 1.4542 and 1.4534, as steel 1.4614 nonetheless may be cold drawn into an elongated shape.

For producing the electrical feedthrough 5 at low cost, the glass joining agent 4 is provided as a sintered body. The production of sintered bodies is inexpensive and they may be produced in large quantities. It is required, however, that the glass joining agent 4 already abuts against the members 2, 3, 6, 7 to be joined before the material joint 24, 34 is created. For example, if the gap is too large, then no continuous and pore free and/or shrink hole free material bonded joint 24 with the opening wall 72 will be produced upon melting of the glass joining agent 4. However, due to the way sintered bodies are produced, sintered bodies exhibit large tolerances. For example, shrinkage often occurs during production due to compaction of the starting material powder. For sintered bodies with increasing lengths, tolerances of less than 10% can only be obtained with great effort and related costs. However, the length of an insulation path 11 of an electrical feedthrough 5 must be more than the diameter of the opening 71 in the housing 7 to ensure that it is not damaged by leverage forces that may occur perpendicularly to the longitudinal axis L. It has been found that an electrical feedthrough 5 may be produced at particularly low costs when the size of the ceramic member 3 is at least ⅔ of the diameter of the opening 71 in the direction of the longitudinal axis L while the length of the glass joining agent 4 along the longitudinal axis L is at least two times smaller than the diameter of the joining means 4 in a direction perpendicular to the longitudinal axis L. This is advantageous because it is not necessary that the glass joining agent 4 primarily contributes to the length of the insulation path 11 since the major part of the insulation path 11 is insulated by the length of the ceramic member 3.

An electrical feedthrough 5 through a body is fabricated, for example, by means of the following steps.

Fabrication of the elongated opening 71 in the housing 7. This may be carried out, for example, by machining processes such as turning, drilling, milling or grinding or by water jet cutting, laser cutting, eroding or similar suitable machining methods.

Insertion of the ceramic member 3 at least partially in the opening 71 to extend parallel to the longitudinal axis L wherein the ceramic member 3 has a hollow-cylindrical shape. Other shapes which preserve the function of the ceramic member 3, i.e. insulating the conductor 6 from the housing 7, are also conceivable.

Insertion of the glass joining agent 4 at least partially in the opening 71 parallel to the longitudinal axis L and abutting against the ceramic member 3 wherein the glass joining agent 4 has a hollow-cylindrical shape.

Insertion of the conductor 6 in the hollow-cylindrical ceramic member 3 and in the glass joining agent 4 so that the ceramic member 3 and the glass joining agent 4 at least partially surround the conductor 6 radially along the longitudinal axis L.

At least partially liquefying the glass joining agent 4 by heating the conductor 6 and housing 7 and glass joining agent 4 arranged as described above to a temperature above the melting temperature of the glass joining agent 4. Penetration of at least bismuth-containing portions of the glass joining agent 4 into the ceramic member 3 and formation of the mixing region 10.

Changing the temperature of the conductor 6 and housing 7 and glass joining agent 4 arranged as described above to a temperature below the melting temperature of the glass joining agent 4 and formation of a joint 1 that comprises a material bonded joint 24 between the glass joining agent 4 and the conductor 6 and a material bonded joint 34 between the glass joining agent 4 and the ceramic member 4; and formation of a further joint 1 that comprises a material bonded joint 24 between the glass joining agent 4 and the housing 7 and a material bonded joint 34 between the glass joining agent 4 and the ceramic member 3.

The size of the mixing region 10 is given by the time period during which the temperature of the glass joining agent 4 exceeds its melting temperature. The size of the mixing region 10 may also be affected by the temperature level above the melting temperature of the glass joining agent 4.

In a presently preferred embodiment, the alloy member 2 and/or the conductor 6 and/or the housing 7 is corrosion-resistant. Alloys with a chromium content of at least 10.5% are corrosion-resistant.

In one embodiment, at least one alloy member 2 and/or one ceramic member 3 and/or one conductor 6 and/or one housing 7 is provided with a gold layer. This is advantageous since the gold layer does not significantly affect the thermal expansion and, in addition, the alloy member 2 and/or the ceramic member 3 and/or the conductor 6 and/or the housing 7 are protected from environmental impacts by the gold layer since gold is a precious metal with well-known chemical resistance. It is particularly advantageous to coat the conductor 6 with a layer of gold. This increases conductivity compared to a martensitic alloy described above. Likewise, silver or platinum may be used instead of gold. In the context of the present invention, an alloy member 2 and/or ceramic member 3 and/or conductor 6 and/or housing 7 coated in this manner still exhibits the coefficient of thermal expansion of the material that was coated.

In one embodiment, the housing 7 of an electrical feedthrough 5 is joined to a sensor housing 92 or a device housing 92 by a material bonded joint S, for example by a soldered joint or a welded joint, as exemplarily shown in FIG. 11 in a cross-sectional view (FIG. 22 is a schematic representation of a top plan view in the XY plane). A material bonded joint S may also be an adhesive joint achieved by means of an adhesive. A sensor housing 92 or device housing 92 is a metallic component made of a metal or an alloy. Preferably, a device housing 92 or sensor housing 92 is made of the same alloy as the housing 7 or is at least made of a martensitic steel.

The invention also relates to a sensor 9 as schematically exemplified in a cross-sectional view in FIG. 12 and in FIG. 23 in a top plan view in the XY plane. Sensor 9 comprising at least one sensor member 8, a metallic sensor housing 92 and at least one electrical feedthrough 5. The sensor housing 92 substantially encloses an interior C. The at least one sensor member 8 is arranged in the interior C of the sensor housing 92. The sensor housing 92 defines at least one feedthrough opening 91. In each feedthrough opening 91 is introduced one of the at least one electrical feedthroughs 5. The at least one sensor member 8 is connected to the at least one conductor 6 in an electric current conducting manner. The electrical feedthrough 5 connects the interior C to an exterior D by one of the at least one conductors 6 in an electric current conducting manner. The sensor member 8 is configured to detect a physical quantity. A signal corresponding to the physical quantity may be received in the exterior D via the conductor 6. The electrical feedthrough 5 is joined to the sensor housing 92 by a material bonded joint S, for example a soldered joint or a welded joint. Other material bonds S, for example by means of an adhesive, are also conceivable.

Preferably, the sensor housing 92 is made of the same material as the housing 7 of the feedthrough 5. This is in particular a martensitic steel, for example one of the steels having the EN material numbers 1.4542, 1.4534 or 1.4614.

A sensor 9 is, for example, an acceleration sensor, a force sensor, a torque sensor, a pressure sensor or a temperature sensor. In some embodiments, the first four sensors mentioned particularly employ piezoelectric sensor members 8 generating piezoelectric charges on their surfaces upon mechanical deformation. Piezoelectric sensor members 8 must be tightly sealed from an exterior D in the interior C of the sensor 9. This protects the piezoelectric sensor members 8 from environmental impacts, especially moisture. The sensor 9 requires a high isolation resistance for precisely detecting piezoelectric charges, which isolation resistance is deteriorated when moisture penetrates the sensor 9.

In some embodiments, an acceleration sensor 9, a force sensor 9, a torque sensor 9, a pressure sensor 9 or a temperature sensor 9 preferably uses piezoresistive sensor members 8, which upon mechanical impact undergo a change in electrical resistance. Also, these sensor members 8 must be disposed tightly sealed from an exterior D in the interior C of the sensor 9.

Further embodiments of a joint 1 between a ceramic member 3 and an alloy member 2 may be conceived that combine various features of the embodiments disclosed in this document.

Likewise, further embodiments of an electrical feedthrough 5 may be conceived that combine various features of the embodiments disclosed in this document.

Likewise, further embodiments of a sensor 9 may be conceived that combine various features of the embodiments disclosed in this document.

LIST OF REFERENCE NUMERALS

1 joint
2 alloy member
3 ceramic member
4 glass joining agent
5 feedthrough
6 conductor
7 housing
8 sensor member
9 sensor
10 10' mixing region
11 insulation path
24 material bonded joint
31 opening
34 material bonded joint
61 conductor diameter
71 opening
72 opening wall
73, 73' end member
91 feedthrough opening
92 sensor housing, device housing
A, B region
C interior
D exterior
L longitudinal axis
S material bonded joint, weld-bonded joint

What is claimed is:

1. A joint that joins an alloy member having a coefficient of thermal expansion of at least $9 \cdot 10^{-6}$ $K^{-1}$ and a ceramic member having a maximum coefficient of thermal expansion of $8 \cdot 10^{-6}$ $K^{-1}$, the joint comprising:
   a glass joining agent made of a glass having a melting point below 800° C., a bismuth content of at least 10% and a coefficient of thermal expansion of at least $9 \cdot 10^{-6}$ $K^{-1}$;
   a first material bonded joint that is disposed between the glass joining agent and the alloy member and joins the glass joining agent to the alloy member;
   a second material bonded joint that joins the glass joining agent to the ceramic member;
   wherein the second material bonded joint between the glass joining agent and the ceramic member defines a mixing region that is a partial region of the ceramic member; and
   wherein the mixing region has a higher bismuth content compared to the bismuth content of the ceramic member outside of the mixing region.

2. The joint according to claim 1, wherein the mixing region is located spatially adjacent to the glass joining agent; and wherein the bismuth content in the mixing region increases towards the glass joining agent.

3. The joint according to claim 1, wherein the bismuth content decreases from the glass joining agent to the mixing region.

4. The joint according to claim 3, wherein the mixing region has a spatial extension from the glass joining agent of at least 0.001 mm; and wherein the mixing region is delimited by the extension of the ceramic member and is further delimited within the ceramic member by a plane in which the bismuth content in the ceramic member equals 1/e of the bismuth content in the ceramic member in the mixing region directly adjacent to the glass joining agent.

5. The joint according to claim 1, wherein the glass joining agent is free of lead; and wherein the glass joining agent is made of a glass having a melting temperature below 650° C.

6. The joint according to claim 1, wherein the glass joining agent is free of lead; and wherein the glass joining agent is made of a glass having a melting temperature below 800° C.

7. The joint according to claim 1, wherein the ceramic member is electrically insulating; and
   wherein the ceramic member has a content that includes aluminum oxide, zirconium oxide, silicon oxide or a mixture of these materials; and wherein said content is at least 95%.

8. The joint according to claim 7, wherein said content is at least 70%.

9. The joint according to claim 1, wherein the alloy member has a polycrystalline structure; and wherein the average grain size of the polycrystalline structure on average is less than 0.01 mm.

10. The joint according to claim 1, wherein the alloy member is a martensitic steel having the EN material numbers 1.4542, 1.4534 or 1.4614.

11. The joint according to claim 1, wherein the glass joining agent comprises more than 50% $Bi_2O_3$, 1% to 10% $B_2O_3$, 10% to 50% ZnO, 1% to 10% $SiO_2$, 0.1% to 1% $Al_2O_3$.

12. The joint according to claim 1, wherein the glass joining agent comprises more than 50% $Bi_2O_3$, 1% to 10% $B_2O_3$, 1% to 10% ZnO, 0.1% to 1% $CeO_2$.

13. The joint according to claim 1, wherein the glass joining agent comprises more than 50% $Bi_2O_3$; , 1% to 10% $B_2O_3$, 1% to 10% ZnO, 0.1% to 1% $CeO_2$, 0.1% to 1% $ZrO_2$.

14. An electrical feedthrough for conducting electrical charges from a first region to a second region, the electrical feedthrough comprising:
   a first alloy member that defines a housing that includes a wall extending along a longitudinal axis and defining a wall opening about the longitudinal axis;

a second alloy member that defines an electrical conductor that elongates along the longitudinal axis and is disposed at least partially within the wall opening of the housing;

a ceramic member, which is electrically insulating and at least partially disposed within the wall opening and radially enclosing at least a portion of the elongation of the electrical conductor along the longitudinal axis so as to electrically insulate the electrical conductor from the wall opening;

a first joint that joins the electrical conductor and the ceramic member;

a second joint that joins the housing wall and the ceramic member;

wherein each of the first joint and the second joint includes a glass joining agent disposed within the wall opening adjacent to the ceramic member at a mixing region of the ceramic member and radially surrounding at least a portion of the elongation of the electrical conductor along the longitudinal axis;

wherein the glass joining agent is made of a glass having a melting point below 800° C., a bismuth content of at least 10% and a coefficient of thermal expansion of at least $9 \cdot 10^{-6}$ $K^{-1}$; and wherein the mixing region has a higher bismuth content compared to the bismuth content of the ceramic member outside of the mixing region.

15. The electrical feedthrough according to claim 14, wherein the first joint and the second joint are configured to effect a seal between the first region and the second region.

16. The electrical feedthrough according to claim 15, wherein the tight seal between the first region and the second region is not impaired by permanent or temporary temperatures off up to 350° C.

17. The electrical feedthrough according to claim 14, wherein the electrical conductor is defined by a diameter, wherein an insulation path is defined by a portion of the elongation of the electrical conductor along the longitudinal axis electrically insulated from the wall opening by the ceramic member and the glass joining agent, wherein the ratio of the length of the insulation path to the diameter of the electrical conductor is greater than three.

18. The electrical feedthrough according to claim 14, wherein the length of the joining agent along the longitudinal axis is at least two times smaller than the diameter of the joining agent in a direction perpendicular to the longitudinal axis.

* * * * *